(12) United States Patent
Sundmark et al.

(10) Patent No.: US 7,641,226 B2
(45) Date of Patent: Jan. 5, 2010

(54) SIDE AIRBAG MODULE WITH AN INTERNAL GUIDE FIN

(75) Inventors: Håkan Sundmark, Alingsås (SE); Jamison Pexton, Bountiful, UT (US); David Erickson, Clinton, UT (US)

(73) Assignee: Autoliv Development AB, Vargarda (SE)

( * ) Notice: Subject to any disclaimer, the term of this patent is extended or adjusted under 35 U.S.C. 154(b) by 124 days.

(21) Appl. No.: 11/591,104

(22) Filed: Nov. 1, 2006

(65) Prior Publication Data

US 2008/0100043 A1 May 1, 2008

(51) Int. Cl.
*B60R 21/16* (2006.01)
(52) U.S. Cl. .................................. 280/730.2
(58) Field of Classification Search ............ 280/730.2, 280/730.1, 743.1
See application file for complete search history.

(56) References Cited

U.S. PATENT DOCUMENTS

| 5,499,840 A | 3/1996 | Nakano |
| 5,503,428 A | 4/1996 | Awotwi et al. |
| 5,779,263 A | 7/1998 | Lane, Jr. et al. |
| 5,803,485 A | 9/1998 | Acker et al. |
| 5,944,342 A | 8/1999 | White, Jr. et al. |
| 6,045,151 A | 4/2000 | Wu |
| 6,062,593 A | 5/2000 | Satani et al. |

FOREIGN PATENT DOCUMENTS

| EP | 0769429 A2 | 4/1997 |
| EP | 0 818 365 A1 | 7/1997 |
| EP | 0 826 565 A2 | 8/1997 |
| EP | 0 940 299 A1 | 9/1998 |
| EP | 1407943 A2 | 4/2004 |
| GB | 2398546 A | 8/2004 |
| JP | 2000-85515 | 3/2000 |
| JP | 2001-114060 | 4/2001 |
| WO | WO 2004/074050 A1 | 9/2004 |
| WO | WO 2005/110820 A1 | 11/2005 |

*Primary Examiner*—Faye M. Fleming
(74) *Attorney, Agent, or Firm*—Brinks Hofer Gilson & Lione

(57) ABSTRACT

A side airbag module for use in a motor vehicle. The module includes a gas generator attached to a folded airbag. The folded airbag unfolds into an interior of the motor vehicle when the gas generator is activated. A large guide fin is disposed within an interior of the airbag such that the airbag is disposed around the guide fin. The guide fin is connected to a component attached to the motor vehicle.

23 Claims, 2 Drawing Sheets

SIDE AIRBAG MODULE WITH AN INTERNAL GUIDE FIN

BACKGROUND

1. Field of the Invention

The present invention generally relates to airbags for use as an impact protection device for an occupant of a motor vehicle. More specifically, it relates to a impact side airbag module with a gas generator and an airbag that unfolds into an interior of a motor vehicle when the associated gas generator activates.

2. Description of Related Art

An existing design of a side airbag module include a gas generator mounted inside a vehicle seat. The gas generator is mounted on one side of the seat structure and projects into a side bolster of the vehicle seat back pointing in a direction of travel. An airbag is disposed within the side bolster and arranged around and attached to the gas generator. A front end of the airbag near the end of the side bolster is attached to a seam in the upholstery covering the side bolster.

With the above described known airbag arrangement, where the airbag is accommodated in the side bolster of the vehicle seat back, there is the disadvantage that the airbag has to be folded into an opening formed into the side bolster of the vehicle seat and the front end has to be attached to the upholstery. This makes assembling such a side airbag quite complex. A further disadvantage is that when the gas generator is activated, the gas stream which is released expands into the airbag without a specific direction, potentially resulting in a less than optimal airbag deployment.

In view of the above, it is apparent that there exists a need for an improved side airbag module.

SUMMARY OF THE INVENTION

The present invention includes a large guide fin disposed within an interior of a folded side impact airbag. The guide fin is attached to a component which is fixed to the vehicle. The airbag is disposed over the guide fin for improved folding and packaging within a seat of the motor vehicle. A further advantage is that a substantially flat form factor for the side airbag module is possible. The large-area of the guide fin also advantageously ensures improved targeted expansion and improved unfolding of the airbag during deployment.

According to one embodiment of the present invention, the guide fin helps define a desired shape of the folded airbag. The guide fin also improves the targeting of the airbag while unfolding during deployment.

In another embodiment the guide fin includes two plates, arranged at a distance from one another that form a gas guide channel communicating with a gas generator. At a rear end opposite the expansion direction of the airbag the two plates are connected to one another by means of an arcuate connecting wall which surrounds an exterior of the gas generator. The connecting wall is attached to the gas generator so that the guide fin is secured to the gas generator.

In yet another embodiment of the present invention, the plate oriented toward the outer side of the vehicle when the side airbag module is installed in the vehicle is longitudinally longer than a shorter plate lying opposite. The space which lies in front of the shorter plate in the expansion direction, which is also limited on the outer side by the larger plate, serves as a packing space for the folded airbag.

According to an alternative embodiment of the present invention, two identical plates may be arranged substantially parallel to one another. This has the advantage that a gas stream from the gas generator is guided to the front end of the airbag which is folded over the guide fin, so that unfolding is initiated from the front end of the airbag as it emerges from the side airbag module.

According to another aspect of the invention, the gas guide channel is completely formed between the two plates of the guide fin.

In another example, the plates of the guide fin may be formed with thin walls. This results in a very flat module including the gas guide channel. Also, when the gas stream is guided between the two plates of the guide fin, the plates may move or oscillate and hot gases of the gas stream may be cooled.

The cooling of the gas stream is improved if, according to an embodiment of the invention, the guide fin consists of flexible material. In this arrangement the guide fin may consist of a plastic material. This has the additional advantage that, for example, in case of a fire during the manufacturing or transport process, the fin loses its rigidity or melts and therefore the side airbag module behaves in a neutral manner if the gas generator activates due to high temperatures. Flexible material should be understood as basically rigid in order to provide a stiffness of the complete side airbag module, but also flexible in order to provide such cooling effect with the described movement of the plates.

According to another embodiment of the invention, it is provided that the airbag which is folded over the guide fin is also attached to a fabric of a seat with regard to by means of at least one tear seam.

According to one embodiment of the invention, it is provided that the gas generator is formed as an axially extending gas generator oriented along a height of the plates.

In order to manufacture a pre-mounted airbag unit which can easily be built into the vehicle seat, it can be provided that the airbag module surrounded by an outer cover. The outer cover is preferably flexible and of light weight and can include a shrinkable foil.

As an alternative to the outer cover including a shrinkable foil it can be provided that the airbag is fixed by tear seams in its folded form, whereby the tear seams can also extend through the guide fin.

According to one embodiment of the invention, at least one bolt is fixed to the gas generator, which extends through the plate on the inner side of the vehicle and is also fixed to the component which is fixed to the vehicle.

Finally, according to one embodiment of the invention, it is intended that the side airbag module is attached to the structure of a vehicle seat in the motor vehicle.

BRIEF DESCRIPTION OF THE DRAWINGS

Figure 1:
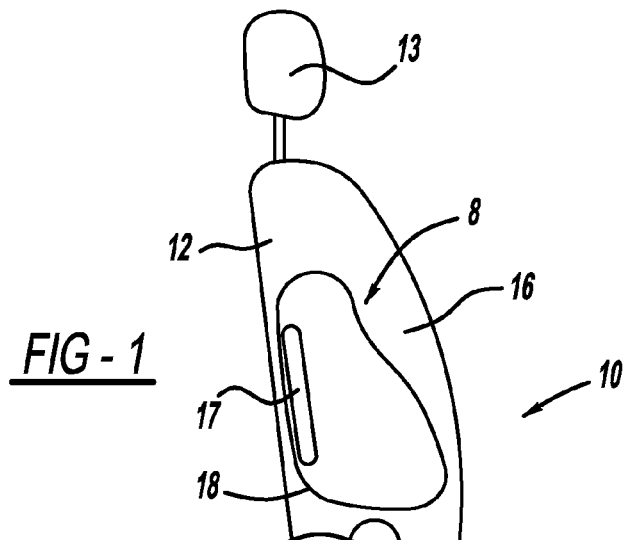
FIG. 1 is a side view of a vehicle seat with a side airbag module arranged in the side bolster of the seat back.

A vehicle seat 10 shown in schematic form in FIG. 1 has a seat cushion 11 and a backrest 12 onto which a headrest 13 is attached. Backrest 12 is arranged to be adjustable in relation to seat cushion 10 by means of backrest adjustment 14. An adjustment 15 for changing a hardness of the backrest is also provided in the backrest 12. A side bolster 16 projecting forwards from the backrest 12 includes a side impact airbag module 8 having a gas generator 17 and an airbag 18.

Figure 2:
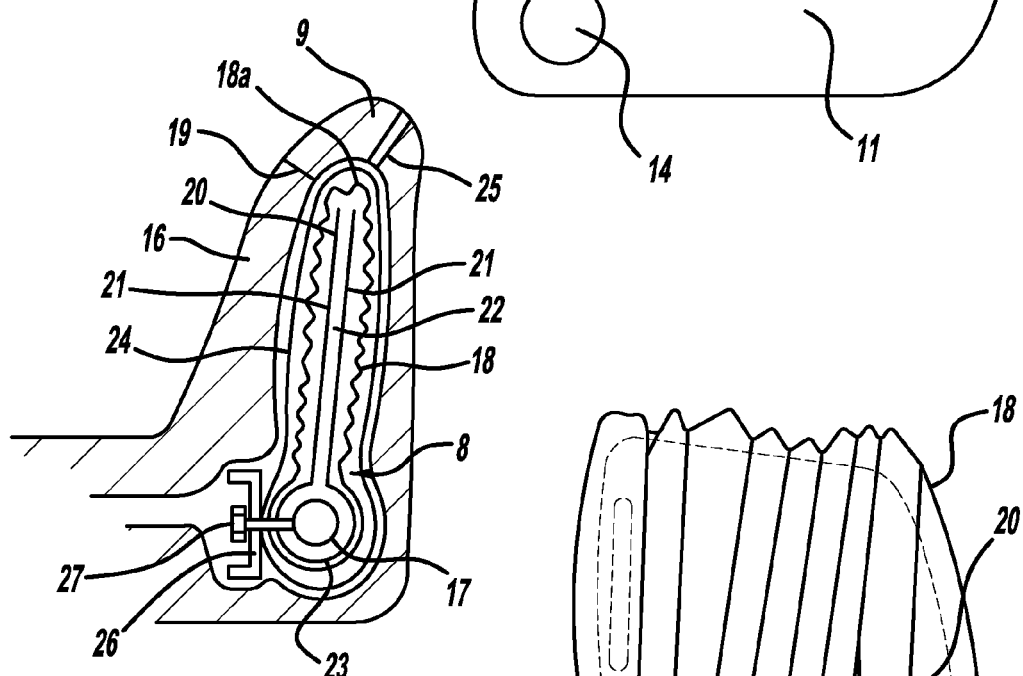
FIG. 2 is a sectional view of the side cheek of the motor vehicle seat including the side airbag module.

As can be seen in more detail in FIG. 2, a recess 19 is provided within the side bolster 16 of the backrest 12 to accommodate the side airbag module 8. The upholstery 9 of the side bolster 16 includes a break location 25 for opening the side bolster 16 upon activation of the airbag module 8 to allow the airbag 18 to exit during airbag deployment.

A guide fin 20 is also located in the recess 19 of the side bolster 16. The guide fin 20 includes two plates 21 arranged at a distance from one another and form a gas guide channel 22 between them. A rear end the two plates 21 are connected to one another by means of a connecting wall 23 which surrounds an exterior of the gas generator 17 and attaches the guide fin 20 to the gas generator 17. At one side, the gas generator 17 is fixed to a vehicle seat frame 26. The frame 26 forms a component which is fixed by a fixing means 27 to the airbag module 8. The airbag 18 is arranged over guide fin 20 in a compact folded arrangement in such a way that guide fin 20 is located inside the airbag module 8.

Figure 3:
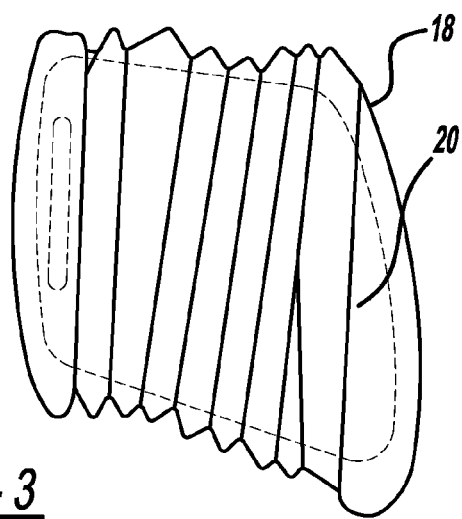
FIG. 3 is a perspective view of a guide fin with an airbag of the side airbag module folded over the guide fin.

From FIG. 3 it can be seen how airbag 18 is arranged over the guide fin 20. The airbag 18 also surrounds the connecting wall 23 on its outside and is penetrated by the fixing means 27. The end of the guide fin 20 which points in an expansion direction of the airbag 18. In some examples, the plates 21 are not attached by the fixing means 27 to the component or vehicle seat frame 26.

Returning to FIG. 2, the airbag 18 is folded over guide fin 20 and surrounded on its exterior by a shrinkable foil 24. This creates a pre-assembled unit including the gas generator 17, guide fin 20, folded airbag 18 and the exterior shrinkable foil 24. Thus, the unit only has to be connected with vehicle seat frame 26 by means of the one or more fixing means 27.

An alternative not shown in the drawing omits the shrinkable foil. Instead, the airbag can be fixed in its compact folded state and location by means of tear seams. The tear seams can additionally extend through the guide fin 20 and the plates 21.

When the gas generator 17 is activated, a gas stream flows via the gas guide channel 22 to a front end 18a of airbag 18. Thus, the unfolding airbag 18 tears open the break point 25 in the side cheek 16 and unfolds out of vehicle seat 10.

Figure 4:
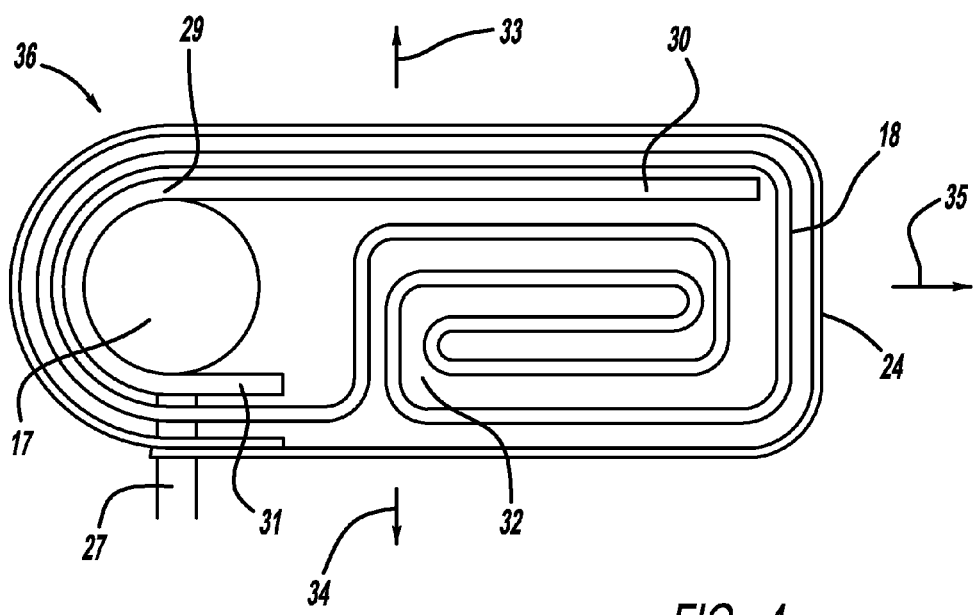
FIG. 4 is a sectional view through the side airbag module of an alternate embodiment.

In the case of the embodiment of the side impact airbag module 36 shown in FIG. 4, the two plates forming a guide fin 29 are formed with different lengths. An outer plate 30, which faces towards the outer side of vehicle 33 when it is installed in the vehicle and corresponds to the length of the folded airbag 18, is longitudinally longer than the opposite plate facing towards the inner side of the vehicle 34, which is formed as a shorter plate 31. Shorter plate 31 has just enough length to direct the gas exiting from an activated gas generator 17 in the expansion direction 35 of the expanding airbag. This arrangement increases the size of a packing space 32 in the expansion direction 35 of the gas in front of the short plate 31. The airbag 18 is folded into the packing space 32. Around its exterior, the folded airbag 18 is surrounded by an exterior cover, for example, the shrinkable foil 24. In this embodiment, a fixing means 27 is formed on to the gas generator 17. The fixing means 27 penetrates through the short plate 31 and is suitable for fixing the side airbag module to a component fixed to the vehicle, preferably to the vehicle seat such as that described in relation to FIGS. 1 to 3.

The guide fins 20 and 29, in some examples, may be made of a flexible material. The flexible material may include various plastic materials. The gas generator 17 has a minimum activation temperature, and the flexible material may be configured to lose rigidity or melt, at a temperature lower than the minimum activation temperature. Thus, instead of the guide fin 20 or 29 directing and focusing the gas if the gas generator is accidentally activated in, for example, a fire, the flexible material will lose rigidity before the gas generator activates. This will cause the gas to expand in a more diffuse manner instead of being directed by the guide fin. This results in a more neutral response by the airbag module to an accidental high temperature activation of the gas generator 17.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A side impact airbag module for use in a motor vehicle, the module comprises a gas generator attached to a folded airbag, the folded airbag configured to unfold into an interior of the motor vehicle when the gas generator is activated, a guide fin disposed within an interior of the folded airbag and having a rigid shape which includes at least a portion corresponding to a flat plate, and when the gas generator is unactivated, the guide fin defining a shape of the folded airbag such that the shape of the folded airbag corresponds to the rigid shape of the guide fin, the guide fin being connected to a component attached to the motor vehicle.

2. The side airbag module according to claim 1, wherein the rigid shape of the guide fin is substantially the same as the shape of the folded airbag.

3. The side airbag module according to claim 1, wherein the guide fin includes a first plate and a second plate that are spaced a distance apart from one another to form a gas guide channel therebetween communicating with the gas generator, at a rear end opposite an expansion direction of the folded airbag, the two plates are connected to one another by a connecting wall configured to surround an exterior of the gas generator, the connecting wall is attached to the gas generator to secure the guide fin to the gas generator.

4. The side airbag module according to claim 3, wherein the first plate is positioned toward an outside of the vehicle when the side airbag module is installed in the vehicle and is longitudinally longer than the second plate that is positioned toward the inside of the vehicle and the folded airbag is packed within a packing space along the first plate and in front of the second plate.

5. The side airbag module according to claim 3, wherein the first and second plates are two identical plates arranged substantially parallel to one another.

6. The side airbag module according to claim 3, wherein the gas guide channel is completely formed between the two plates of the guide fin.

7. The side airbag module according to claim 3, wherein the plates of the guide fin are formed of a thin walled material.

8. The side airbag module according to claim 1, wherein the guide fin is made of a material that is sufficiently rigid to support an adjacent side of the folded airbag but is sufficiently flexible to allow movement of the guide fin in response to hot gas being guided along the guide fin, the hot gas being generated from the gas generator.

9. The side airbag module according to claim 8, wherein the material of the guide fin includes a plastic material.

10. The side airbag module according to claim 9, wherein the plastic material of the guide fin is selected to lose rigidity at a temperature lower than an activation temperature of the gas generator resulting in a neutral response by the side airbag module in the event that the gas generator is activated by high temperatures.

11. The side airbag module according to claim 1, wherein the airbag is arranged over the guide fin and is secured in place to the guide fin before unfolding.

12. A side impact airbag module for use in a motor vehicle, the module comprises a gas generator attached to a folded airbag, the folded airbag configured to unfold into an interior of the motor vehicle when the gas generator is activated, a guide fin disposed within an interior of the folded airbag and having a substantially rigid shape defining a shape of the folded airbag such that the shape of the folded airbag corresponds to the rigid shape of the guide fin, the guide fin being connected to a component attached to the motor vehicle, the airbag arranged over the guide fin and secured in place to the guide fin before unfolding wherein the airbag is secured in place by means of at least one tear seam.

13. The side airbag module according to claim 1, wherein the gas generator is formed as an axially extending gas generator oriented along a height of the guide fin.

14. The side airbag module according to claim 1, wherein the folded airbag disposed about the guide fin includes an exterior cover.

15. The side airbag module according to claim 14, wherein the exterior cover is made of a second flexible material that includes a shrinkable foil.

16. The side airbag module according to claim 1, wherein at least one bolt penetrates through a plate arranged on the inner side of vehicle and through the component fixed to the vehicle to secure the airbag module to the component.

17. The side airbag module according to claim 1, wherein the component is a portion of a seat frame of a vehicle seat, the vehicle seat being attached to the motor vehicle.

18. A side impact airbag module for use in a motor vehicle, the module comprises a gas generator attached to a folded airbag, the folded airbag configured to unfold into an interior of the motor vehicle when the gas generator is activated, a guide fin disposed within an interior of the folded airbag and having a rigid shape, and when the gas generator is unactivated, the guide fin defining a shape of the folded airbag such that the shape of the folded airbag corresponds to the rigid shape of the guide fin, the guide fin being connected to a component attached to the motor vehicle, wherein the guide fin includes a first plate and a second plate that are spaced a distance apart from one another to form a gas guide channel therebetween communicating with the gas generator, at a rear end opposite an expansion direction of the folded airbag the two plates are connected to one another by a connecting wall configured to surround an exterior of the gas generator.

19. The side airbag module according to claim 18, wherein the first plate is positioned toward an outside of vehicle when the side airbag module is installed in the vehicle and is longitudinally longer than the second plate that is positioned toward the inside of the vehicle and the folded airbag is packed within a packing space along the first plate and in front of the second plate.

20. The side airbag module according to claim 18, wherein the first and second plates are two identical plates arranged substantially parallel to one another.

21. The side airbag module according to claim 18, wherein the guide fin is made of a material that is sufficiently rigid to support an adjacent side of the folded airbag but is sufficiently flexible to allow movement of the guide fin in response to hot gas being guided along the guide fin, the hot gas being generated from the gas generator.

22. The side airbag module according to claim 21, wherein the material of the guide fin includes a plastic material.

23. The side airbag module according to claim 22, wherein the plastic material of the guide fin is selected to lose rigidity at a temperature lower than an activation temperature of the gas generator resulting in a neutral response by the side airbag module in the event that the gas generator is activated by high temperatures.

* * * * *